United States Patent Office 3,285,427
Patented Nov. 15, 1966

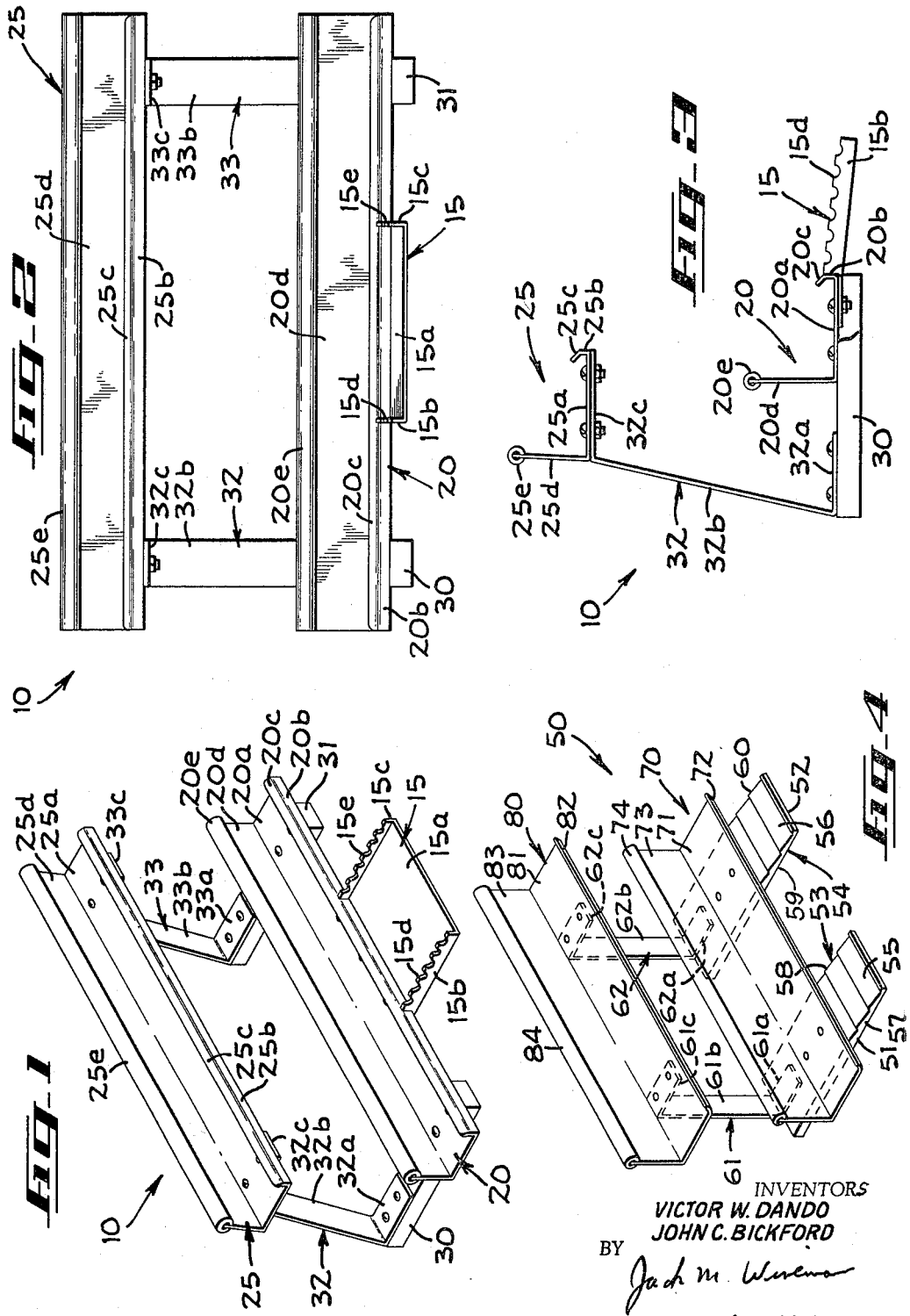

3,285,427
TOOL HOLDER
Victor W. Dando, 948 Planetree Place, and John C. Bickford, 661 Santa Coleta Court, both of Sunnyvale, Calif.
Filed Feb. 15, 1965, Ser. No. 432,694
1 Claim. (Cl. 211—60)

The present invention relates in general to tool holders, and more particularly to a tool holder adapted for use in supporting tools and implements employed in electronic and related assembly operations.

Heretofore, the electronic assembler was faced with the continuous problem of tool sorting and tool hunting during each productive cycle. This factor was a cause in loss of time and motion. Consequently, the efficiency of the operator was greatly reduced.

An object of the present invention is to provide a tool holder for electronic assemblers that improves the efficiency of the operator independently of the workbench set-up or work orientations.

Another object of the present invention is to provide a tool holder for electronic assemblers that facilitates the handling of tools by enabling the tools to be grasped easily and by enabling the tools to be readily observed.

Another object of the present invention is to provide a tool holder for electronic assemblers that reduces sorting and hunting time for the operator.

Other and further objects and advantages of the present invention will be apparent to one skilled in the art from the following description taken in conjunction with the accompanying drawings in which:

FIG. 1 is a perspective view of the tool holder of the present invention.

FIG. 2 is a front elevational view thereof.

FIG. 3 is an end elevational view thereof.

FIG. 4 is a perspective view of a modified tool holder.

Illustrated in FIGS. 1–3 is the tool holder 10 of the present invention which is adaptable for use in supporting tools, implements and devices employed in electronic assembly operations. The tool holder 10 comprises a forwardly projecting, serrated tray 15, a lower tray 20 and an upper tray 25.

As shown in the drawings, a pair of spaced legs 30 and 31 in the form of rectangular solids made of suitable material, such as cast iron, form a base for the tool holder 10, which rests on any suitable supporting surface.

Secured to the legs 30 and 31, respectively, at the rearward portion thereof and projecting upwardly therefrom are straps 32 and 33, which are made of suitable material, such as aluminum. The straps 32 and 33 comprise respectively horizonal sections 32a and 33a, which are secured to the legs 30 and 31 by suitable screws. Projecting upwardly from the horizontal sections 32a and 33a at approximately right angles are substantially upright sections 32b and 33b of the hangers 32 and 33, respectively. The hangers 32 and 33 also include horizontal sections 32c and 33c, which are disposed above and in parallel relation with the horizontal sections 32a and 33a, respectively.

Fixed to the legs 30 and 31 at the forward portions thereof by suitable screws is the lower tool tray 20. The lower tool tray 20 includes a base 20a. Upstanding from the base 20a is a forward wall 20b with an inwardly curved lip 20c at the free end thereof. Also, upstanding from the base 20a is a rearward wall 20d that is parallel with the forward wall 20b. The rearward wall 20d is substantially higher than the forward wall 20b. The tray 20 is made of suitable materials, such as aluminum. A bumper 20e in the form of a rubber extrusion is mounted along the upper edge of the rearward wall 20d.

Mounted on the upper horizontal section 32e and 33e of the hangers 32 and 33 by suitable nuts and bolts is the upper tool tray 25. The upper tool tray 25 includes a base 25a. Upstanding from the base 25a is a forward wall 25b with an inwardly curved lip 25c at the free end thereof. Also upstanding from the base 25a is a rearward wall 25d that is parallel with the forward wall 25b. The rearward wall 25d is substantially higher than the forward wall 25b. The tray 25 is made of suitable material, such as aluminum. A bumper 25e in the form of a rubber extrusion is mounted along the upper edge of the rearward wall 25d.

The trays 20 and 25 are longitudinally extending and are transversely spaced from one another. Similarly, the pairs of upstanding walls of each of the tool trays are longitudinally extending and transversely spaced walls. Thus, the base of each tray has its length determined from the longitudinal direction and its width from the transverse direction.

The tray 15 is fixedly secured to the base 20a of the lower tool tray 20 by suitable nuts and bolts. As shown in the drawings, the tray 15 projects forwardly from the lower tray 20 and comprises a rectangular base 15a. Integrally formed with the base 15a are upstanding, longitudinally spaced end walls 15b and 15c that are serrated or toothed along the upper edges 15d and 15e thereof. The edges 15d and 15e have rounded valleys or grooves therein to receive cylindrical objects, such as probes, pencils and the like. The tray 15 is made of suitable material, such as aluminum.

In the use of the tool holder 10, the tray 15 is adapted to support such items as pencils, probes, scales and range sticks, which are inserted with the grooves of the edges 15d and 15e to extend in the longitudinal direction. On the other hand, the trays 20 and 25 are employed to support pliers, cutting tools and the like. In so doing, the tools extend in the transverse direction between the rubber bumper 25e and the lip 25c of the forward wall 25b and also between the rubber bumper 20e and the lip 20c of the forward wall 20b. In this manner, the tools are disposed on a slant and thereby grasped with facility and ease of operation and are presented to the operator in full view so as to be easily seen.

Illustrated in FIG. 4 is a tool holder 50, which is a modification of the tool holder shown in FIGS. 1–3. The tool holder 50 comprises a pair of legs 51 and 52, which are made of cast iron. Integrally formed with the legs 51 and 52 and projecting forwardly therefrom are forwardly projecting trays 53 and 54, which are also made of cast iron.

The trays 53 and 54 include rectangular bases 55 and 56, respectively. Integrally formed with the base 55 are upstanding, longitudinally spaced end walls 57 and 58 that are formed with valleys and grooves along the upper edges thereof to receive cylindrical objects, such as probes, pencils and the like. Similarly, integrally formed with the base 56 are upstanding, longitudinally spaced end walls 59 and 60 that are formed with valleys and grooves along the upper edges thereof to receive cylindrical objects, such as probes, pencils and the like.

Secured to the legs 51 and 52, respectively, at the rearward portion thereof and projecting vertically upward therefrom are straps 61 and 62. The straps 61 and 62 comprise respectively horizontal sactions 61a and 62a, which are secured to the legs 51 and 52 by suitable screws. Projecting vertically upward from the horizontal sections 61a and 62a are upright sections 61b and 62b of the hangers 61 and 62, respectively. The hangers 61 and 62 also include horizontal sections 61c and 62c, which are disposed above and in parallel relation with the horizontal sections 61a and 62a.

Fixed to the legs 30 and 31 at the forward portions thereof by suitable screws is a lower tool tray 70, which includes a base 71. Upstanding from the base 71 is a forward wall 72. Also, upstanding from the base 71 is a rearward wall 73 that is parallel with the forward wall 72. The rearward wall 73 is substantially higher than the forward wall 72. The tray 70 is made from suitable material, such as aluminum. A bumper 74 in the form of a rubber extrusion is mounted along the upper edge of the rearward wall 73. The tray 70 is employed to support pliers, cutting tools and the like. In so doing, the tools extend in the transverse direction between the rubber bumper 74 and the upper edge of the forward wall 72. In this manner, the tools are disposed on a slant and thereby grasped with facility and ease of operation and are presented to the operator in full view so as to be easily seen.

Mounted on the upper horizontal sections 61c and 62c of the hangers 61 and 62 by suitable nuts and bolts is an upper tool tray 80, which includes a base 81. Upstanding from the base 81 is a forward wall 82. Also, upstanding from the base 81 is a rearward wall 83 that is parallel with the forward wall 82. The tray 80 is made of suitable material, such as aluminum. A bumper 84 in the form of a rubber extrusion is mounted along the upper edge of the rearward wall 83. The tray 80 is employed to support pliers, cutting tools and the like. In so doing, the tools extend in the transverse direction between the rubber bumper 84 and the upper edge of the forward wall 82. In this manner, the tools are disposed on a slant and thereby grasped with facility and ease of operation and are presented to the operator in full view so as to be easily seen.

It is to be understood that modifications and variations of the embodiment of the invention disclosed herein may be resorted to without departing from the spirit of the invention and the scope of the appended claims.

Having thus described our invention, what we claim as new and desire to protect by Letters Patent is:

A tool holder comprising a pair of legs, a forwardly projecting tray for each of said legs, said forwardly projecting trays being integrally formed with its associated leg, a lower tray mounted by said legs, an upper tray, and means interconnecting said legs and said upper tray.

References Cited by the Examiner

UNITED STATES PATENTS

| | | | |
|---|---|---|---|
| 893,155 | 7/1908 | Evans | 211—60 |
| 952,593 | 3/1910 | Wagner | 211—60 |
| 1,661,787 | 3/1928 | Chisholm | 211—60 |
| 1,842,262 | 1/1932 | Gibson | 211—128 |
| 1,918,329 | 7/1933 | Gore | 211—135 |
| 2,045,614 | 6/1936 | Reynolds | 211—72 |
| 2,143,338 | 1/1939 | Watkins | 108—92 |
| 2,166,798 | 7/1939 | Cote | 264—248 |
| 3,199,684 | 8/1965 | Bradley | 211—74 |

FOREIGN PATENTS 1,129,505   5/1962   Germany.

CLAUDE A. LE ROY, *Primary Examiner.*

W. D. LOULAN, *Assistant Examiner.*